United States Patent
Rasmussen

(10) Patent No.: US 6,787,206 B2
(45) Date of Patent: Sep. 7, 2004

(54) CROSS-LAMINATE OF FILMS AND METHOD OF MANUFACTURING

(76) Inventor: Ole-Bendt Rasmussen, Sangenstrasse 12, CH-6318, Walchwil/Zug (CH)

( * ) Notice: Subject to any disclaimer, the term of this patent is extended or adjusted under 35 U.S.C. 154(b) by 0 days.

(21) Appl. No.: 10/311,022

(22) PCT Filed: Jun. 8, 2001

(86) PCT No.: PCT/EP01/06535
§ 371 (c)(1),
(2), (4) Date: Dec. 12, 2002

(87) PCT Pub. No.: WO01/96102
PCT Pub. Date: Dec. 20, 2001

(65) Prior Publication Data
US 2003/0148064 A1 Aug. 7, 2003

(30) Foreign Application Priority Data
Jun. 12, 2000 (GB) .............................................. 0014313
Aug. 14, 2000 (GB) .............................................. 0019997

(51) Int. Cl.$^7$ ................................................ B32B 5/12
(52) U.S. Cl. ...................... 428/34.8; 428/105; 428/112; 156/163; 264/173.12
(58) Field of Search ............................. 428/105, 112, 428/34.9, 910; 156/163; 264/173.15

(56) References Cited
U.S. PATENT DOCUMENTS

| | | | | |
|---|---|---|---|---|
| 3,649,431 A | * | 3/1972 | Parker ......................... | 428/137 |
| 4,239,111 A | * | 12/1980 | Conant et al. .............. | 206/484 |
| 4,407,877 A | * | 10/1983 | Rasmussen ................. | 428/105 |
| 4,767,488 A | * | 8/1988 | Rasmussen ................. | 156/344 |
| 4,793,885 A | * | 12/1988 | Rasmussen ................. | 156/200 |
| 5,135,800 A | * | 8/1992 | Nagaoka et al. ............ | 428/216 |
| 5,633,065 A | * | 5/1997 | Matsukura et al. ......... | 428/112 |
| 6,532,119 B1 | * | 3/2003 | Martinez, Sr. .............. | 359/884 |
| 2003/0148064 A1 | * | 8/2003 | Rasmussen ................. | 428/119 |

FOREIGN PATENT DOCUMENTS

| | | | |
|---|---|---|---|
| FR | 2 369 177 | * | 5/1978 |
| FR | 2 666 049 | * | 1/1992 |
| GB | 1 526 722 | * | 9/1978 |

* cited by examiner

*Primary Examiner*—D. Lawrence Tarazano
(74) *Attorney, Agent, or Firm*—William J. Daniel

(57) ABSTRACT

A cross-laminate web is formed of two oriented films, the films being arranged so that the main direction of orientation of the first film (A) generally follows the longitudinal direction (D) of the web and the main direction of the second film (B) is perpendicular (F) to that direction. The coefficient of elasticity of the material of the first film, in an unoriented state, is at least 115% lower than that of the material of the second film, and the heat shrinkability of the first film is greater than that of the second film. Bags formed from the cross-laminate have heat seals with improved shock peel strength.

21 Claims, 9 Drawing Sheets

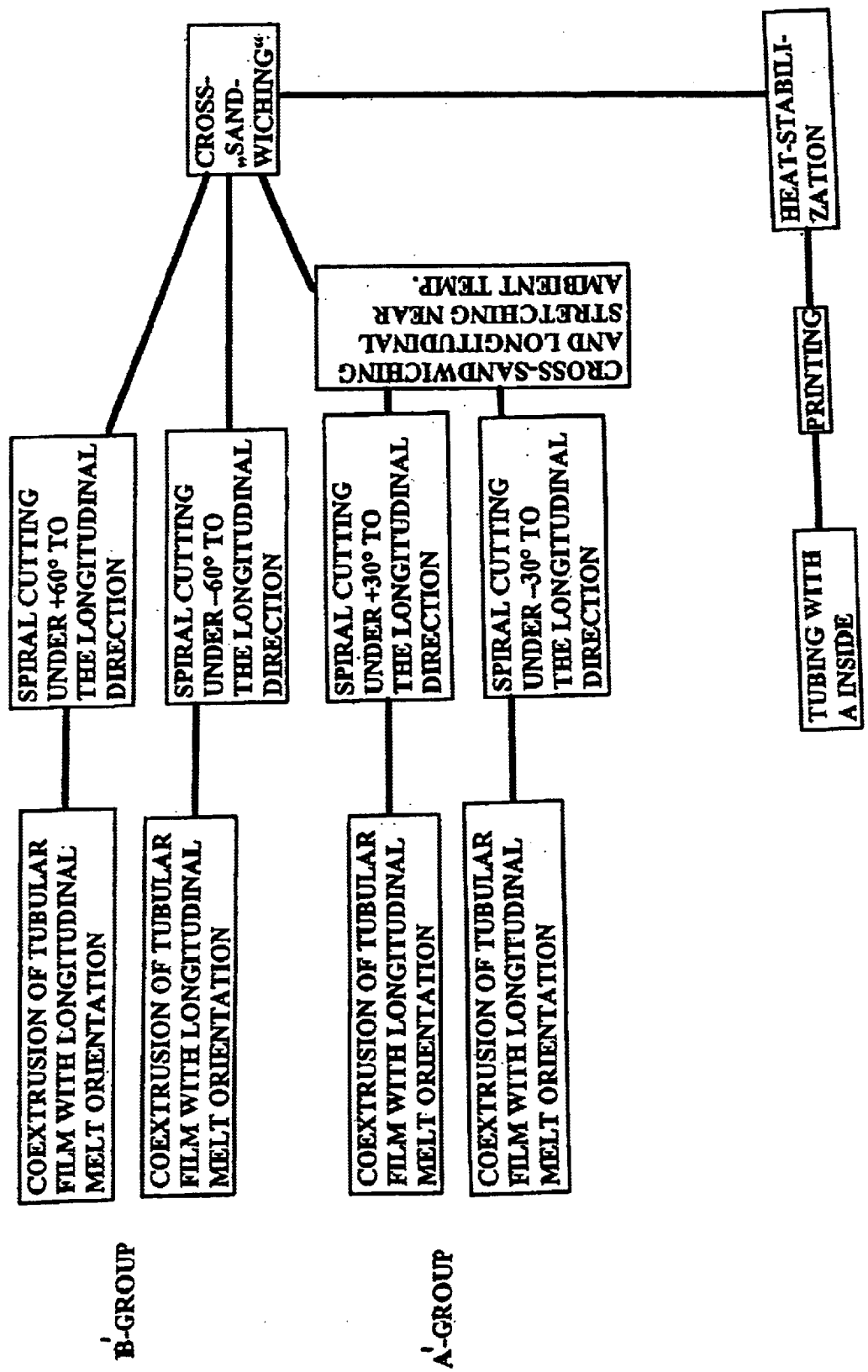

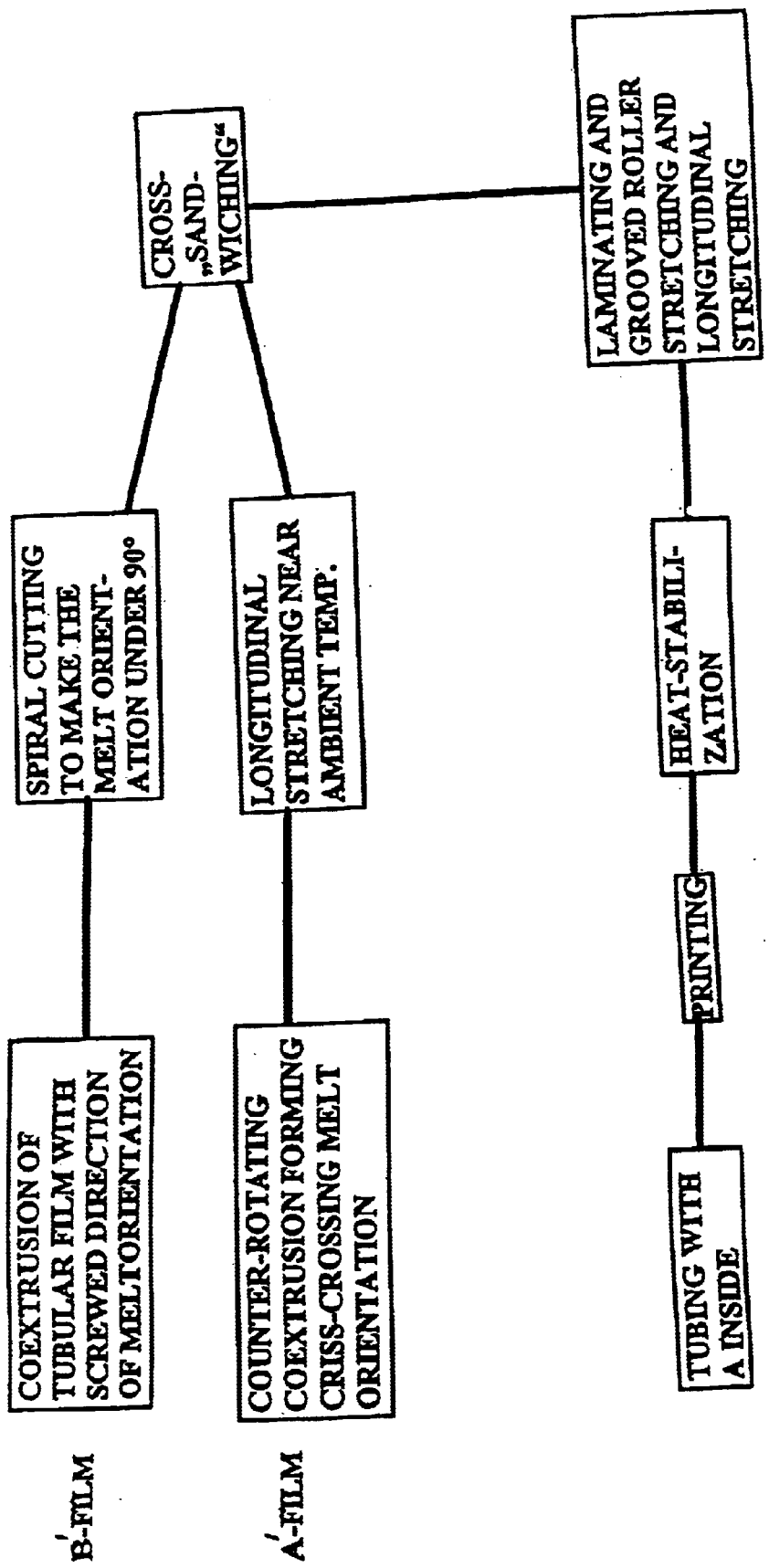

2 mm

CROSS-LAMINATE OF FILMS AND METHOD OF MANUFACTURING

Figure 1:
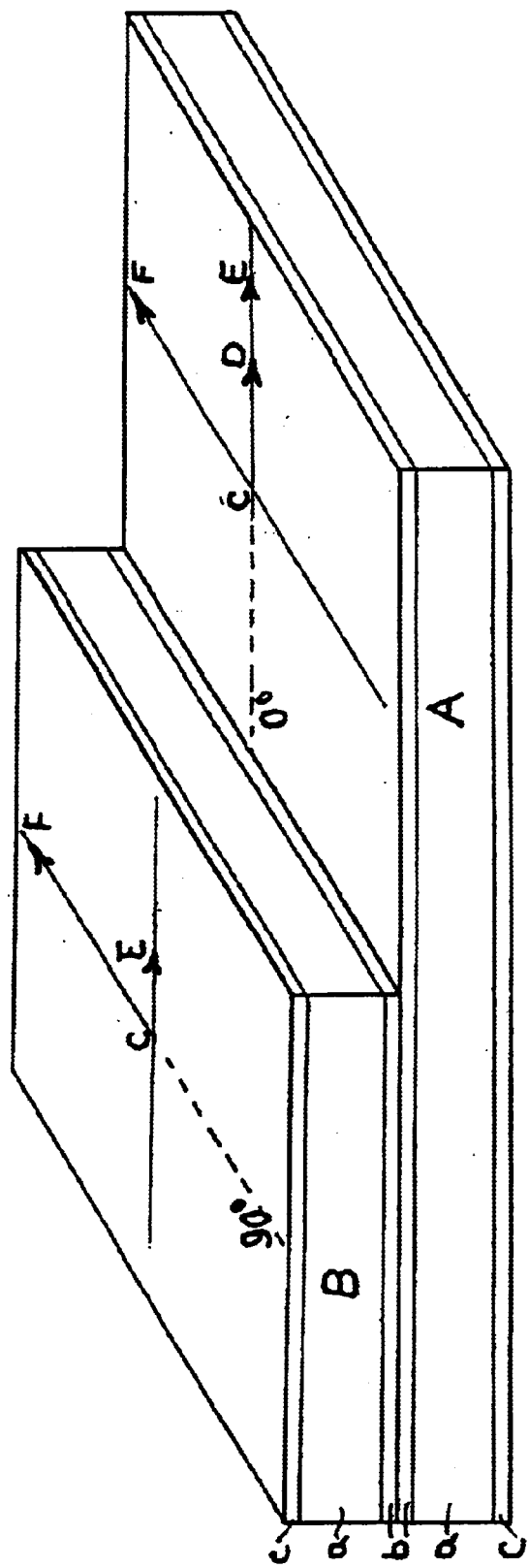

Webformed cross-laminates consisting of two or more mutually bonded films, which are unuaxially oriented or unbalanced biaxially oriented, have been commercially available since 1968, but have always presented problems in heatsealing.

These first cross-laminates have been produced with the compositions, structure and method described in GB-A-0, 792,976 of Apr. 9, 1958 and GB-A-0,816,607 of Jul. 15, 1959. A tubular film of polyethylene (normally HDPE) or polypropylene has been strongly uniaxially oriented in its longitudinal direction by stretching at a relatively low temperature, then helically cut to a web with its orientation on bias, and two or more such webs have then been laminated, usually by extrusion lamination, with crisscrossing directions of orientation. When such cross-laminates are heatsealed, e.g. by impulse sealing, to form a "peel-type" heatseal, the impact peel strength of the seal has turned out to be exceptionally low (except if the seal is improved by additional material, e.g. by overtaping).

By "peel-type" heatseal is understood a heatseal adapted to withstand peeling forces concentrated in a lineary very narrow zone, as opposed to an "overlap type" heatseal made to withstand the shearing forces, which are distributed over the entire width of the seal.

Impact- or shock-peel strength is particularly needed in heatsealed bags to withstand the shock action when the bag is dropped on one of its edges perpendicular to the linearly extending heatseal.

The poor peeling strength of the seal is due to the fact that the heatsealing ruins the orientation, not only in the bonded part of the seal—where loss of orientation does not matter—but also in immediately adjacent narrow "lines" of unbonded cross-laminate. Upon shock-peeling these "lines" appear weak and tend to rupture. (At lower velocities of peeling, when the material in these lines has time to elongate and orient, the seals may give a satisfactory peel-strength).

The shock-peel strength can be improved, but not sufficiently, by coextruding thin lower melting surface layers ("heatseal layers") on the films used for manufacture of the cross-laminate. However, when the heatsealing takes place at a temperature at which the orientation in the main layers is maintained, another phenomenon occurs, namely that the two cross-laminates separate from each other since the peeling force is concentrated in the thin bonding layers. To avoid such separation, the films in and immediately adjacent to the bonded zone must be allowed to shrink and thereby grow in thickness, by which the tensions created by the peeling will be reduced.

As described in GB-A-1,526,722 improvements in shock-peel-strength of heatseals (and certain other strength advantages) has been obtained by a different method of producing cross-laminates. In the usual way of practising this method (which has been commercial since 1978) there is first coextruded a tubular film with a generally uniaxial, longitudinal orientation, and with minor surface layers for facilitating the subsequent lamination process ("lamination layers"), and for improving the surface characteristics of the final cross-laminate, especially its heatsealing properties ("heatseal layers"). This tubular film is then helically cut to form a web with melt orientation on bias, and several such webs are continuously cross-"sandwiched" and further oriented by transverse stretching between grooved rollers and—before or after this operation—subjected to conventional longitudinal stretching between ordinary smooth rollers which rotate at different circumferential velocities. The grooved rollers stretching is usually repeated several times, and the longitudinal stretching may also be repeated. For obtaining maximum energy-absorbing properties, also with a view to the shock-peel strength of the heatseal, the longitudinal and transverse stretching steps after bringing the helically cut films together to a "sandwich" is normally carried out at temperatures very much below the melting ranges of the films, and may even be carried out at normal ambient temperature. U.S. Pat. No. 4,629,525 discloses a subsequent heat-stabilization process. I have also suggested arranging the films of such laminates such that one has a main direction of orientation generally following the longitudinal direction of the cross-laminate and the other has a main direction of orientation substantially perpendicular to the longitudinal direction.

There is normally achieved a significant bonding between the cross-"sandwiched" films, so that they will form a laminate, already by the stretching between grooved rollers, and this bonding is increased by the heat-stabilization process. However, a really strong overall bonding is always avoided since this will ruin the tear-propagation resistance, which is a particularly remarkable feature of these cross-laminates.

Improved evenness of the transverse stretching between grooved rollers, and possibilities for higher throughputs, heavier and stiffer cross-laminates is achieved by a method disclosed in EP-B-0,276,100, in which a set of grooved rollers fit extremely fine to each other and act under a high rollers pressure to perform a combined transverse pulling and transverse squeezing. (The example in this present specification makes use of this). The said method is further developed in EP-A-0,624,126.

Practical ways of carrying out the helical cutting are disclosed in EP-B-0,426,702. This patent also explains how a big angle of melt orientation, even 90° to the longitudinal direction of the film, can be achieved by first extruding a tubular film with a "screwed" melt orientation (relative rotation between the extrusion die and the haul-off means) and in a second process helically cutting this tube in a direction which increases the angle of orientation.

Returning to the problem of shock-peel-strength in a heatseal, cross-laminates made according to the method of the above mentioned GB-A-1,526,722 or the above mentioned improvements on this, have since 1978 been used in the manufacture of open-mouth industrial bags sealed in top and/or bottom by a "peel-type" heatseal, and are still used so on a relatively large scale. This includes the use in "form-fill-and-seal" in which the conversion of film to bag takes place in conjunction with the filling operation. However, with the existing need for downgauging the film material for bag making, further improvements are strongly needed. It is hereby important to achieve the improvement in heatseal properties without reducing other important strength properties, in particular the yield tension. The latter is important in connection with stacking of the industrial bags filled with powdered or granular material, since the lower layers of bags in a stack often come under a very high static load.

According to the invention claimed in EP-B-0,338,747 which is developed with a special view to industrial bags made from such cross-laminates, the heatseal is protected by an adjacent row of embossments, which is adapted to act shock absorbing and/or force controlling.

Furthermore according to the invention described in WO-A-98/23434 there is provided a heatseal method—also with a special view to the cross-laminates—which allows a particular high shrinkage of the polymer film, not only in the bonded zone of the heatseal but also in the immediately adjacent, unbonded zones of the film, at the side of the seal which is or is predetermined to come in contact with the contents of the bag. By this high shrinkage the film grows thick in-the said zones, and this compensates for the loss of orientation in these zones. (As mentioned at the beginning of this description the problems in heatsealing of cross-laminates are caused by the loss of orientation in the unbonded zones adjacent to the bonded zone). The invention involves a pivoting of one of the sealing bars.

However, in spite of the proven positive results of these two inventions, the one to protect the seal by means of embossments and the other concerning the special heatseal method, neither of these has met acceptance in the market-place. The reason is that both inventions require special machinery installed by the user which convert the cross-laminate to bags and/or fill and close the bags. Consequently there is a strong need to improve the heatseal properties of the cross-laminate itself without negatively affecting the other strength properties, in particular the yield tension.

The cross-laminate according to the present invention is characterised as follows: A webformed cross-laminate consisting of two or more mutually bonded films or film assemblies, each of which is uniaxially oriented or unbalanced biaxially oriented, characterised in that said laminate comprises (A) on one side of the cross-laminate either a) a film in which the main direction of orientation generally follows the longitudinal direction of the web, or b) an assembly of films, the resultant main direction of which generally follows the said direction, and (B) on the other side of the cross-laminate either a) a film in which the main direction of orientation is generally perpendicular to the longitudinal direction of the web, or b) an assembly of films, the resultant main direction of which is generally perpendicular to the longitudinal direction of the web, and in that the coefficient of elasticity (E) of the material A in unoriented state is at least 15% lower than the coefficient of elasticity of the material B in unoriented state and in that upon heating the cross laminate A and B exhibit differential shrinkability along the said longitudinal direction. A being more shrinkable.

The preferred method of manufacturing it is as follows: A method of manufacturing a cross-laminate in which there is formed a sandwich-web of different films, each exhibiting a main direction of orientation, and wherein these directions cross each other, and subsequently the sandwiched films are further oriented below their melting range by being stretched together in the longitudinal direction of the web, and before or after this longitudinal stretching, also in the transverse direction of the web, this transverse stretching being carried out between grooved rollers, and the films in the sandwich are bonded to form a laminate before, during or after said longitudinal and transverse stretching operations, characterised in that said sandwich-web consists of two films or assemblies of films (A') and (B') respectively, (A') on the one and (B') on the other side of the sandwich-web, whereby (A') is either a) a film in which the main direction of orientation generally follows the longitudinal direction of the sandwich-web, or b) an assembly of films, in which the resultant main direction of orientation generally follows the said direction, and said orientation or resultant orientation is stronger—as measured by shrink testing before (A') and (B') have been brought together to a sandwich—than said orientation or resultant orientation in (B') in the same direction, and further (B') is either a) a film in which the main direction of orientation is generally perpendicular to the longitudinal direction of the web, or b) an assembly of films, in which the resultant main direction of orientation is generally perpendicular to the longitudinal direction of the web, in which the coefficient of elasticity (E) of (A') in unoriented state is at least 15% lower than the coefficient of elasticity of (B') in unoriented state and said orientation or resultant orientation is stronger—referring to shrink testing before A' and B' have been brought together in a sandwich—than the orientation in (A') in the said perpendicular direction.

The differences in shrinkability just referred to are preferably at least 10% and more preferably 15%, 20% or even higher.

The coefficient of elasticity (E) of the material from which A is formed in unoriented state is at least 15% lower than the similar property of the material from which B is formed. The objective of this precaution is to make the forces during peeling less concentrated, while making the cross-laminate, seen as a whole, as stiff as possible.

The unoriented state to which E here refers, can be obtained by melting and resolidifying of A after this has been separated from B, and likewise for B. A suitable technique for delaminating A and B is described in more detail below in the example.

When the cross-laminate according to the invention is used to make a bag with a heatseal perpendicular to the main direction of orientation in (A), and the bag filled with particulate product is accidentally dropped, the higher E in the A-material will tend to give the bag highest elongation in the direction perpendicular to the seam, and the shock-absorbtion resulting from the elongation particularly in this direction enhances the impact strength of the seal.

With a view to the geometry of a stack of filled bags and especially the maintenance of a regular geometry of the stack, any extensibility of the bags has negative effect, but in this respect it is the average between the extensibility in the longitudinal and the transverse directions of the bags which counts, and therefore a high extensibility in the main direction of the (A)-material of the cross-laminate can be offset by a correspondingly low extensibility in the main direction of the (B)-material.

Each of the films here referred to may either be co-extruded or be mono-extruded, i.e. they may each consist of several or of only one layer. Furthermore each of the said films may either be truly uniaxially oriented (referring to molecular orientation), or may be biaxially oriented in unbalanced manner, so that in any case they exhibit a main direction of orientation.

The side of the laminates on which the film or group of films designated as A is located is the side predetermined to become bonded by the heatsealing (usually heatsealing to a similar cross-laminate), namely so that the heatseal extends generally perpendicularly to the longitudinal direction of the cross-laminated web. It can be expected that the cross-laminate mainly will be traded in tube form, with a longitudinal overlap seam, which tube may be a gusseted tube, ready for use in form-fill-and seal. In this embodiment the A-surface must be the inner surface of the tube.

Alternatively the cross-laminate may be folded-over without making it a tube, for the purpose of making bags in which the fold forms the bottom and the side-edges are heatsealed. Also in this case the inner surface of the folded-over construction must be the A-surface.

The relatively high shrinkability of A or A', which is preferably at least 30% and more preferably 35%, 40% or even higher in a direction which is predetermined to become perpendicular to the heatseal, produces a suitably strong contraction and thereby increase of thickness. The heating which inevitably takes place in the neighbourhood of the seal produces differential shrinkage of A and B with a particularly interesting and useful effect—see the photo micrographs FIGS. 8b, c and d—provided the surface regions of the sealing bars are tapered, bent or rounded at the boundaries, as they normally are in order to avoid "scars" in the sealed material.

This differential shrinkage which is based on the claimed properties of the cross-laminate, makes the latter bend in the direction which makes it's A-side concave—as seen on the photo micrographs at some distance from the bonded zone. However, immediately adjacent the bonded zone where the material is molten and soft, there is compensated for this bending by a bending in the opposite direction so that the A-side here becomes convex. This last bending which indirectly is a result of the differential shrinkage, acts as a kind of peeling in molten state and reinforces the seal. Furthermore, the differential shrinkage has the effect that the laminate is pushed towards the sealing bars also at their tapered, bent or rounded edges, where there is no sealing pressure, and this helps to make the material grow thick in the zone which during shock-peeling is critical.

For the sake of good order it must however be mentioned that the seals shown in the photo micrographs have been made by the special sealing method described in WO-A-98/23434, and thereby the above mentioned effects become further accentuated. (More about the conditions under which the heatsealing was carried out is stated in the example).

A feature stated in the description of the method above is the difference between the shrinkage of A and shrinkage of B, when the two films or assemblies of films have been separated from one another. In fact cross-laminates are usually, with a view to the influence of bonding on tear-propagation resistance, made with a relatively low bonding between the individual films (this has already been mentioned) and therefore such separation will normally be easy even at room temperature.

The separated films may be tested for their shrinkability in any desired direction, for instance in the longitudinal direction with respect to the web, or in the direction perpendicular to that direction, when heated to a predetermined suitable temperature. This temperature is, for instance, close to but below the mechanically determined melting point of A or B, whichever exhibits the lower melting point. In the invention it is preferred that the shrinkability expressed in percentage terms of the A film or film assembly is at least 10 units higher (preferably more) than that of the B film or film assembly, in the longitudinal direction of the web, when the shrinkabilities are measured at the same predetermined temperature which is close to but below the mechanically determined melting point of A or B, whichever exhibits the lower melting temperature. The predetermined temperature may be, for instance, 5° C. below the mechanically determined melting point. A convenient measurement temperature when the cross-laminate consists of polyethylene based films is a value in the range 115 to 120° C.

In this connection, the mechanically determined melting point is the temperature at which the film or film assembly, as the case may be, most pronouncedly loses its mechanical stability with temperature increase (maximum differential change) and can conveniently be determined directly on the film or (film assembly) by dynamic spectrometry. The melting point may alternatively be determined from the change in tensile properties with temperature.

The shrink properties of A' and B' before cross-"sandwich" are determined in a similar manner. However if A' and/or B' each consists of more than one film, the determination must take place after bonding of the assembly A" and/or B" without changing the properties, e. g. by means of a soft bicomponent glue.

In the invention advantageously the bonding between A and B can be made weaker than the mutual bonding between the films in the A assembly or the B assemblies when A and/or B consists of more than one film. The advantage of this concerns the general strength properties of the cross-laminate. Suitable values of the bonding strength measured by slow peeling, are between about 0.1 and 0.5 $Ncm^1$, taken as an average between peeling of longitudinally and transversely cut strips. (This indication is not meant to limit the scope of the invention.)

The bonding is preferably facilitated and controlled by coextruded "lamination layers" on each film used for the cross-laminate, and preferably there are also coextruded "heatseal layers" to help two cross-laminates stick together during the heatsealing and/or for other improvements of the surface properties of the laminate.

Normally there will occur some differential shrinkage effect in the cross-laminate of the invention even at ambient temperature, i. e. there will be a tendency to curling around the transverse direction of the web, unless precautions against this are taken. This can be a disadvantage for the handling of the web or of bags made from the cross-laminate. To overcome this problem the cross-section of the web can have a waved shape with stabilized waves, preferably so that the wavelength measured from wave-top to wave-top on one surface of the web is less than 5 mm. However, this waving should preferably be very shallow. In itself it is known to make cross-laminates with such stabilized, shallow waving, see the already mentioned EP A-0, 624,126. The methods here disclosed are directly applicable in connection with the present invention. While such waving of the cross-section of the web totally can eliminate the tendency to curling at ambient temperature, it does not essentially reduce the inventive effects of the differential shrinkage during heat-sealing, since the stabilized waving disappears by transverse shrinkage, when the laminate is heated to temperatures near the melting range.

As it appears from the statement of the method above, the way the sandwiched web is transversely stretched is preferably between grooved rollers, and it is also longitudinally stretched and is bonded to a laminate. There should normally be several steps of grooved rollers stretching, and may also be several steps of longitudinal stretching and of bonding. These processes can be carried out in various sequences, and in this connection the disclosures in the above mentioned GB-A-1,526,722, EP-B-0,276,100 and EP-A-0,624,126 directly apply.

The film or films, which constitute A', is/are preferably—prior to the sandwiching with the film or films which constitute B'—longitudinally oriented by pulling over a frictionally with-holding roller or bar; in other words they are subjected to conventional longitudinal stretching below the melting range, e. g. by being passed over a number of smooth rollers, rotating at different circumferential velocities. It may advantageously be a stretching at temperatures significantly lower than the melting range, e. g. between 20–60° C. If spiral cutting of a tubular extruded A'-film is used in making an A'-film, this spiral cutting should take place prior to said longitudinal pulling.

A' and B' may each be one film, optionally a coextruded multi-layer film (see FIG. 1 and the flow sheet FIG. 4) which is simplest, especially when very low gauges of the cross-laminate are wanted. However, with a view to the general strength properties of the cross-laminate, B' and/or A' are/is preferably composed of at least 2 films as shown in FIGS. 2 and 3 and the flow sheets FIGS. 5 and 6. (The angles of +/−60° and +/−30° indicated in the drawings and in the boxes of the flow sheets are of course examples). Thus, B can be a generally symmetrical arrangement composed of at least 2 films, each with a main direction of orientation forming an angle higher than 50° and lower than 90° to the longitudinal direction of the web while A can be generally symmetrical arrangement composed of at least 2 films, each with a main direction of orientation forming an angle higher than 0° and lower than 35° to the longitudinal direction of the web. A' can be formed of two films which are produced each with a main direction of orientation at an angle higher than zero and lower than 45° to its longitudinal direction, either by spiral cutting of a mainly longitudinal oriented tubular film, or by cutting of a mainly longitudinal oriented tubular film, or by twisting a tubular film while it is hauled off from an extrusion die and is in bubble form, the two films subsequently being assembled to form a generally symmetrical sandwich of the two films and this sandwich being subjected to pulling against a frictionally withholding roller or bar.

Instead of using for A' two films which have been produced by helical cutting under a relatively small angle, it is more practical to use one film with 2 melt-oriented layers formed under use of counter-rotating dieparts as shown in flow sheet FIG. 7. Thus, an A' assembly can be produced by forming a first cross-laminate of 2 melt-oriented layers by means of counter-rotating dieparts, the lamination taking place immediately before, during or immediately after these layers have left the die, preferably with a minor coextruded layer between which is adapted to reduce the bonding, the melt-orientation in each of the 2 layers forming an angle less than 45° to the longitudinal direction of this first cross-laminate, and subsequently subjecting the assembly to pulling against a frictionally withholding roller or bar.

For extrusion of such film and construction of the coextrusion die with counter-rotating dieparts, reference is made to the above mentioned GB-A-1,526,722.

Figure 2:
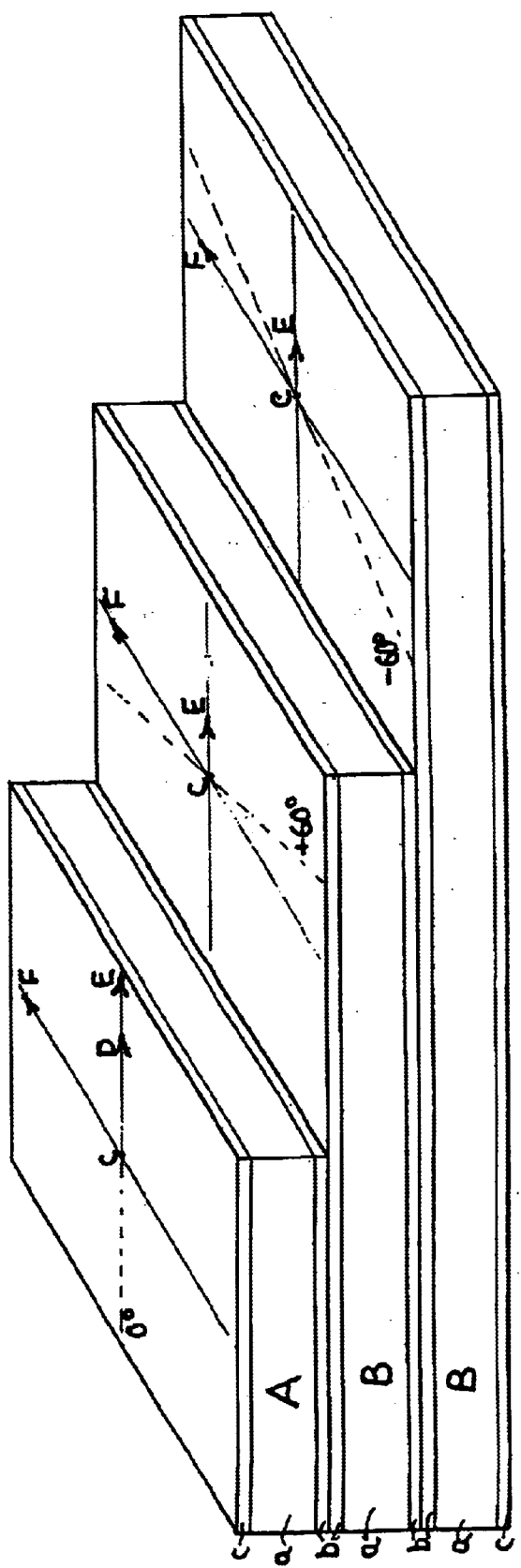
Figure 3:
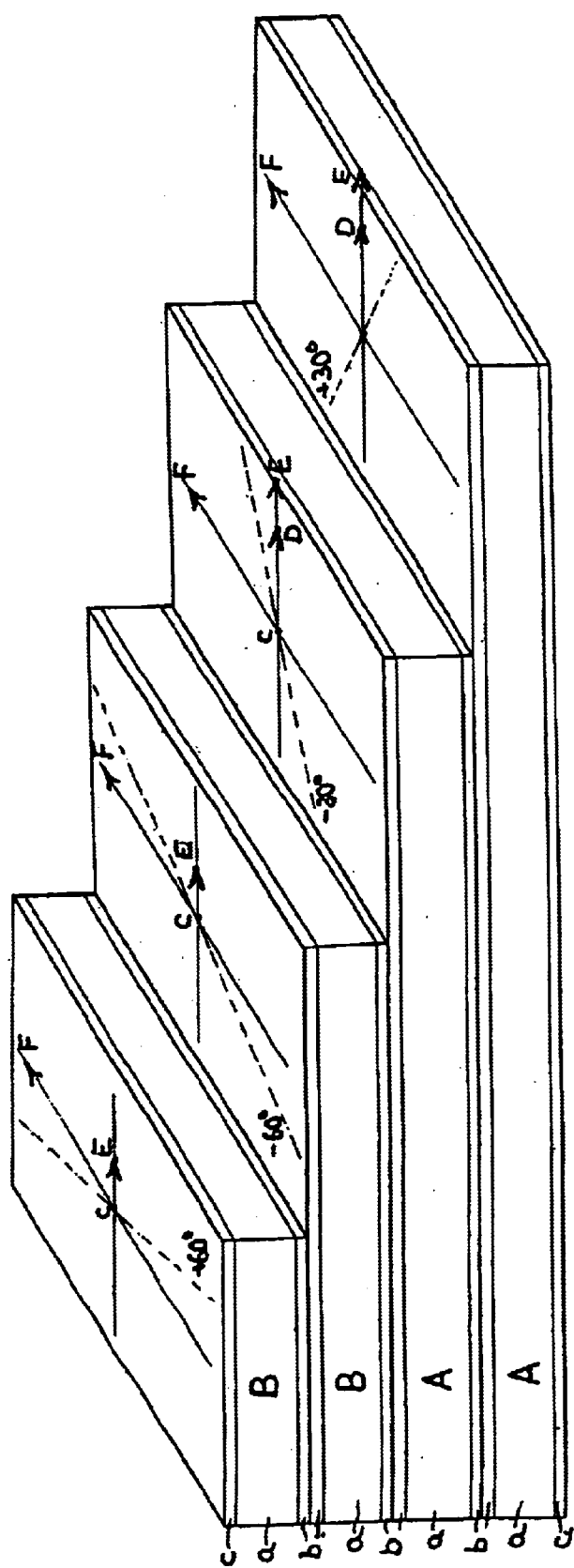
Figure 4:
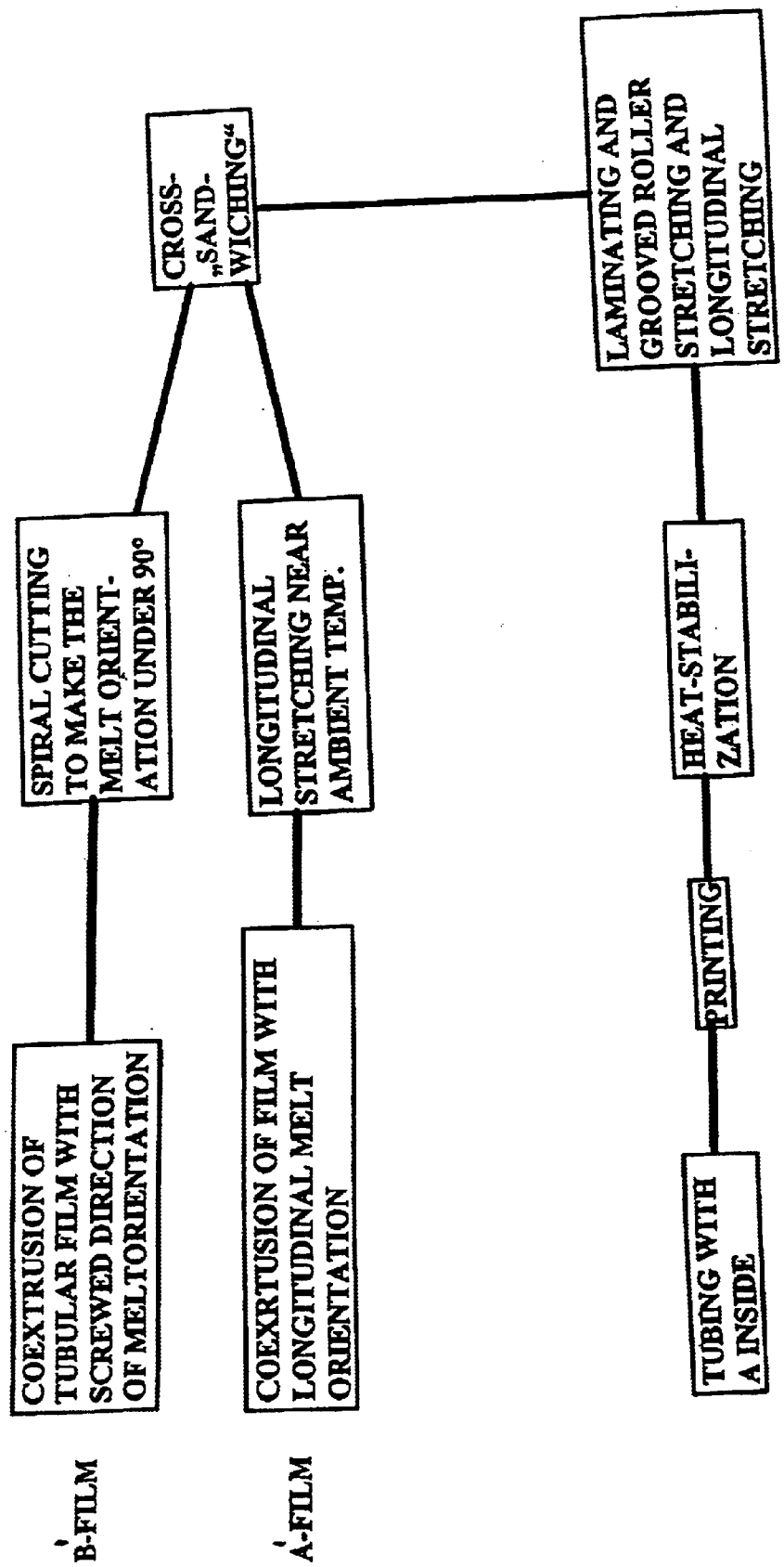

The invention is illustrated by the accompanying drawings, of which:

FIGS. 1, 2 and 3 are perspective sketches of three different constructions of the cross-laminate, FIGS. 4, 5, 6 and 7 are flow sheets of four different routes for making the cross-laminate and converting it to a tube for bag making purposes, including the use for form-fill-and-seal.

Figure 8D:
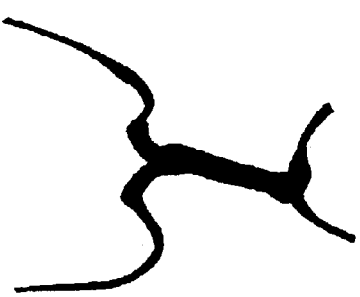
Figure 8C:
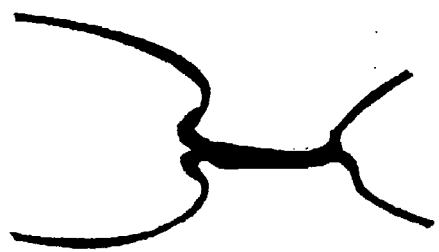
Figure 8B:
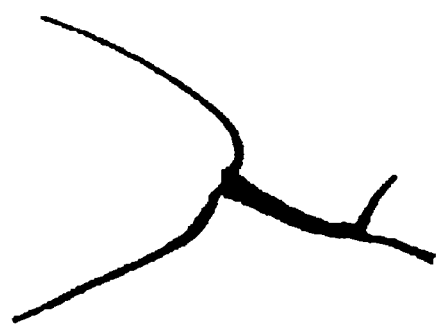
Figure 8A:
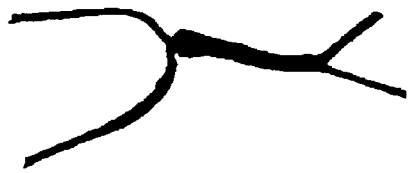

FIGS. 8a, b and c are photo micrographs of cross-sections of heatseals made at different temperatures in the cross-laminate, which is produced as described in the example.

Figure 9:
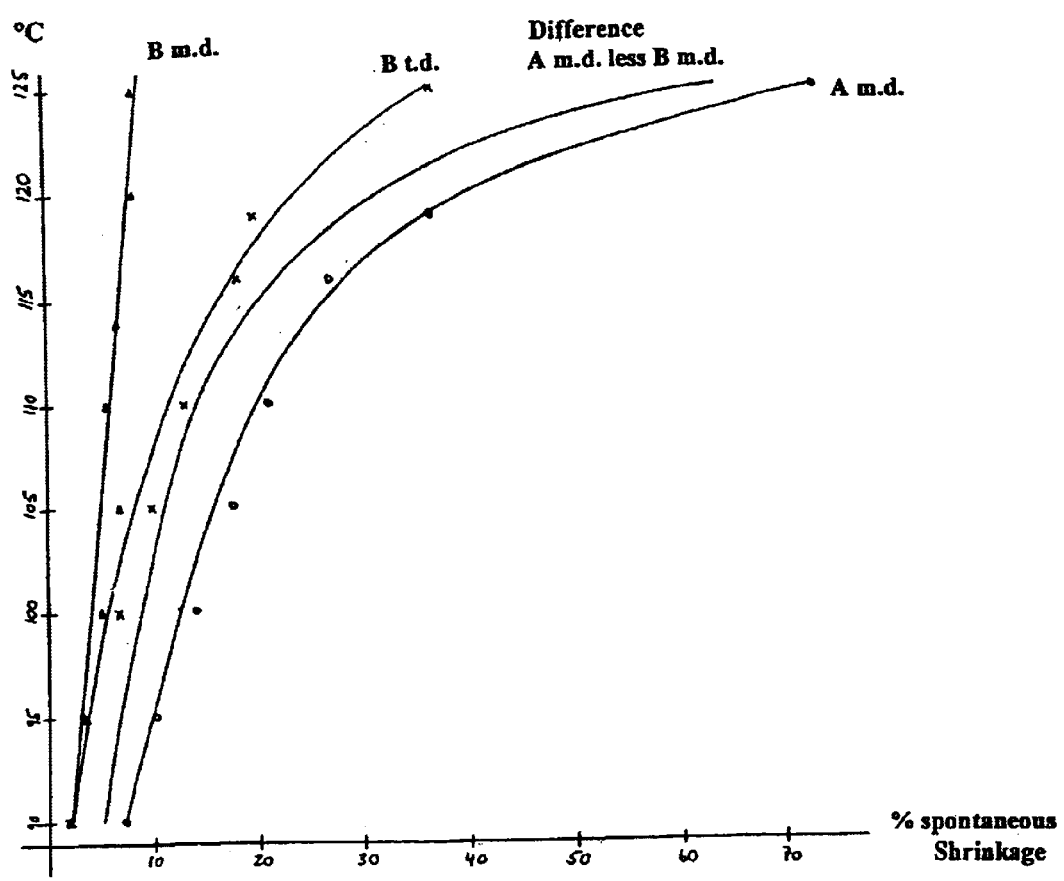

FIG. 9, which refers to the example, are four graphs showing shrink properties of different layers in different directions.

In the perspective sketches FIGS. 1, 2 and 3, (a) are the main layers in which the high tensile strength of the cross-laminates resides, (b) are lamination layers and (c) heatseal layers. The angles of melt orientation before any "sandwiching" has taken place is indicated as dotted lines, and the value of the respective angle is written on the dotted line. The values +60° and −60° are taken as examples of numerically relatively big angles, and +30° and −30° as examples of relatively small angles.

The letters A or A' and B or B' indicate which film or which assembly of films belongs to A or A' and which one to B or B', as described in the claims.

The vector CD indicates the longitudinal orientation produced in A' well below the melting range and before A' is "sandwiched" with B'.

The vectors DE and CF indicate the longitudinal and the transverse orientations, respectively, in the cross-laminate, which are produced after the "sandwiching" of A' to B', the CF-orientation being established by grooved rollers stretching.

With respect to the flow sheets FIGS. 4 to 7 it should be noted that I distinguish between "sandwiching" and "lamination". By "sandwiching" I indicate that two or more films are brought together one on top of the other, no matter whether they become bonded to one another or remain unbonded. By "lamination" I indicate that "sandwiched" films are bonded together (which may be simultaneously with or after the "sandwiching").

In each of the flow sheets there is a box with the text: "Laminating and grooved roller stretching and longitudinal stretching". The reason why these different steps are collected in one box is that—as it already has been mentioned—each of these steps normally is repeated up to several times, and the succession of these steps can be varied.

The photo micrographs FIGS. 8a, b, c and d have a scale bar, to indicated the magnification. The sealing time has been 1.4 s. For purely practical reasons the two sealer bars have had different temperatures, namely as follows:

FIG. 8a: 120° C. on one bar and 130° C. on the other bar
FIG. 8b: 130° C. on one bar and 140° C. on the other bar
FIG. 8c: 150° C. on one bar and 150° C. on the other bar
FIG. 8d: 170° C. on one bar and 180° C. on the other bar The accuracy of the temperature control on each bar was ±2° C.

EXAMPLE

Figure 5:
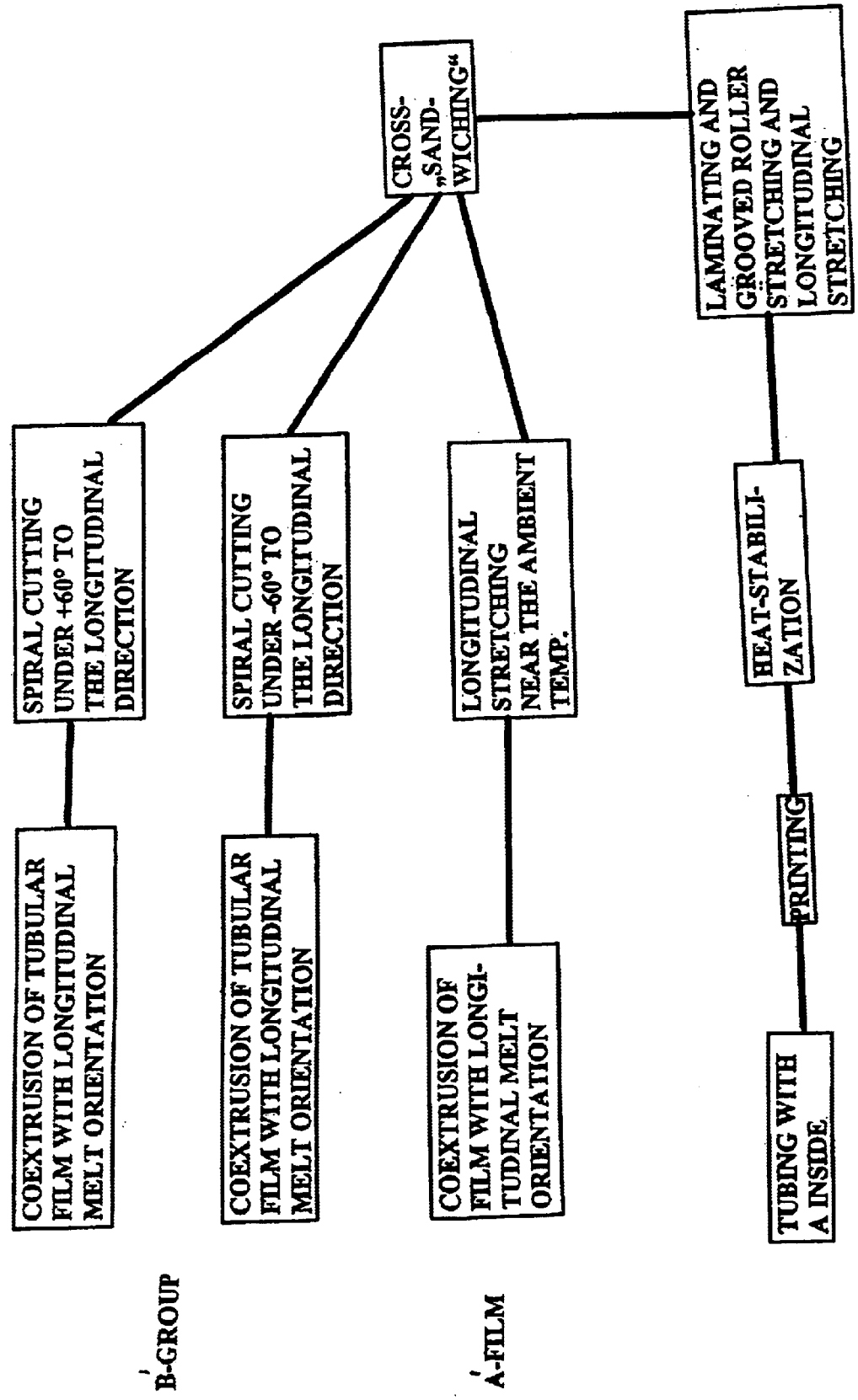

A cross-laminate is produced having the structure shown in FIG. 2 and using the production route shown in the flow sheet FIG. 5 (but omitting the steps "Printing" and "Tubing").

Film A' is coextruded as a tubular film of weight 59 $gm^{-2}$.

Main layer (a) in film A', 75% of total A': 50% LLDPE (Dowlex 2045)+50% HMWHDPE. (Small amounts of masterbatches with pigment and additives are here disregarded).

Heatseal layer (c) in film A', 15% of total A': 100% LLDPE (Dowlex 2045).

Lamination layer (b) in film A', 10% of total A': 15% Affinity 8100+85% LLDPE. (Dowlex 2045). Affinity 8100 is a metallocene LLDPE having melting range about 50–60° C.

Following the extrusion, the film A' is stretched in the ration 1:30:1 in the longitudinal direction at 40° C.

The two films used for B' are extruded in the gauge 45.4 $gm^2$. The main layer (a) consists of 70% HMWHDPE+10% POLYPROPYLENE+20% LLDPE. The lamination layers (b) are of the same composition as those of A'. Furthermore the B' film in the centre of the three-film sandwich has a lamination layer on both surfaces, each 10% of the total weight. The other film B' has a surface heat seal layer(s). Thus, film B' comprises 75% main layer (a), 15% heat seal layer (C) and 10% lamination layer (b).

These two films B' are spiral cut under an angle of 57°.

The three coextruded films A', B' and B' are cross-"sandwiched" as shown in the flow sheet FIG. 5. During the following succession of steps, shown in this flow-sheet, the sandwich is stretched in ratio 1.50:1 in the transverse and about 1.2:1 in the longitudinal direction.

These steps take place essentially as in EP-B-0,276,100 example 3. Gauge of the final cross-laminate is 89 $gm^{-2}$.

A sample of the laminate (about 0.5 m²) is separated into film A and bonded film-group B, and both are treated for shrinkage at different temperatures, A only in the machine direction (m.d.), B in m.d. and transverse direction (t.d.). The separation takes place by hand at room temperature in the following way:

A corner of the sample is repeatedly flexed in order to create fine spots of delamination. An incision between A and B is cut in this flexed corner and the split is propagated by tearing. Due to the relatively weak bonding and the different directions of orientation in the different films, the split will propagate in different directions in the different films, while the tearing forces locally eliminate the bonding. (This phenomenon is the reason why cross-laminates of oriented films show high tear propagation resistance, and therefore cross-laminates are normally made with relatively low bonding between the individual films). Once the delamination has been locally started in this way it is easily carried through by simple hand-peeling without affecting the properties of the individual films. By this peeling film A is separated from film-group B, but the latter is maintained bonded.

A and B are cut into ribbon formed specimens, A along the m.d. and B for one test series along the m.d. and for another series along the t.d. Each ribbon is 15 mm wide and about 10 cm long.

Each test is carried out as follows:

There is marked a 30 mm length near one end of the specimen. There is fixed a 0.7 g weight to this end to keep it straight, and a part of the ribbon including the marked length is dipped into a hot glycerol/water blend for 3 seconds. (This blend has a boiling point of about 135° C., thus it contains so much water that it cannot effect the properties of the polyethylene films). The temperature of the glycerol is adjusted before each such testing, and different temperatures from 90° C. up to about the melting point of normal LLDPE are tried. After the treatment, the shrinkage of the originally 30 mm long length is measured.

The results appear from Table 2 and are plotted in FIG. 9. The latter also comprises a graph showing at each given temperature the difference between the % shrinkage of A and B in their machine directions. This curve is established by measuring the distances between the other two curves. A series of values from the "differential shrinkage" curve is introduced in the table below.

The cross-laminate is heatsealed to itself, A to A, with a sealing procedure exactly as explained in WO-A-98/23434, pp. 20–21, except that different sealing temperatures are tried as recorded in the description of FIGS. 8a, b and c.

Photomicrographs of the profiles of the seals—see these figures—are taken in 12 times magnification under use of a video microscope. The shock-peel strength is tested as explained in WO-A-98/23434, p. 23, I. 37 to 24 I. 11.

The seals made at 130/140° C. and at the higher temperatures passed 100%, which is surprisingly good, while the seals made at 120/130° C. mostly failed.

The yield tension is determined in m.d. and t.d. by strain/stress testing of 15 mm wide ribbonformed specimens at a stretching velocity corresponding to 50% elongation per minute. At this low relative velocity the yield tension will indicate the creep properties, which are very important for industrial bags. The yield tensions are determined from strain/stress graphs. As normal when testing polymer films at such low percent elongation per minute, the graphs do not show sharp changes indicating that yield begins. They start with a linear section where Hook's law applies, then gradually change to another almost linear section, where the tension increases very slowly with elongation (and shortly before break the increase of tension is steep).

As customary, the yield tension is determined graphically by extrapolating the above mentioned two linear sections so that they intersect. The tension corresponding to the intersection point is taken to be the yield tension.

For comparison there is made similar determinations of yield tensions in an industrial bag produced from conventional extruded 147 $gm^{-2}$ film composed of LDPE with contents of LLDPE, a bag which has been selected by one of the major polyolefin manufacturers as suitable for packing of their granules.

The results appear from Table 1. Each value is average of 5 measurements.

TABLE 1

|  | Yield tension m.d. $Ncm^{-1}$ | Yield tension t.d. $Ncm^{-1}$ |
|---|---|---|
| The cross laminate 89 $gm^{-2}$ | 12 | 12 |
| The conventional LDPE/LLDPE film 147 $gm^{-2}$ | 14 | 14 |

Thus the cross-laminate exhibits almost the same yield tensions as the conventional LDPE/LLDPE bag-film, although the letter is 1,6 times heavier.

Finally the E-modulus (coefficient of elasticity) of unoriented A-film is found to be 500 MPa.

and the E-modulus of the unoriented B-group is found to be 630 MPa.

i.e. the E-modulus of A is 21% lower than the E-modulus of B.

These E-values refer to the extruded films and are averages of m.d.-values and t.d.-values, which mutually are close to each other.

TABLE 2

| | Shrinkage | | | | | | |
|---|---|---|---|---|---|---|---|
| Temp ° C. | A m.d. mm/30 mm | A m.d. % | B m.d. mm/30 mm | B m.d. % | B t.d. mm/30 mm | B t.d. % | Δ A m.d. − B m.d. % |
| 90 | 2,0 | 6⅔ | 0,5 | 1⅔ | 0,5 | 1⅔ | 5 |
| 95 | 3,0 | 10 | 1,0 | 3⅓ | 1,0 | 3⅓ | 7 |
| 100 | 4,5 | 15 | 1,5 | 5 | 2,0 | 6⅔ | 9 |
| 105 | 5,5 | 18⅓ | 2,0 | 6⅔ | 3,0 | 10 | 11,5 |
| 110 | 6,5 | 21⅔ | 1,7 | 5⅔ | 4,0 | 13⅓ | 15 |

TABLE 2-continued

| Temp °C. | A m.d. mm/30 mm | A m.d. % | B m.d. mm/30 mm | B m.d. % | B t.d. mm/30 mm | B t.d. % | Δ A m.d. − B m.d. % |
|---|---|---|---|---|---|---|---|
| 114 | | | 2,0 | 6⅔ | | | 19 |
| 115 | | | | | | | 20 |
| 116 | 8,0 | 26⅔ | | | 5,5 | 18⅓ | 22 |
| 119 | 11,0 | 36⅔ | | | 6,0 | 20 | 29 |
| 120 | | | 2,5 | 8⅓ | | | 32 |
| 125 | 220 | 73⅓ | 2,5 | 8⅓ | 11,2 | 37⅓ | 64 |

What is claimed is:

1. A cross-laminate in the form of an elongated web and consisting of two or more mutually bonded films or film assemblies, each of which is uniaxially oriented or unbalanced biaxially oriented, wherein said cross-laminate has on one of its sides a material A comprising either a) a film having a main direction of orientation generally corresponding to the longitudinal direction of the web, or b) an assembly of films having a resultant main direction of orientation generally corresponding to said longitudinal direction, and on the other side a material (B) comprising either a) a film having a main direction of orientation generally perpendicular to the longitudinal direction of the web, or b) an assembly of films having a resultant main direction of orientation generally perpendicular to the longitudinal direction of the web, and the coefficient of elasticity (E) of the material A in its unoriented state is at least 15% lower than the coefficient of elasticity of the material B in its unoriented state and wherein upon heating the cross laminate, materials A and B exhibit differential shrinkability along the said longitudinal direction, A being more shrinkable.

2. A cross-laminate according to claim 1, wherein material A forms at least 10% by weight of the total cross-laminate, and that the shrinkabilities of materials A and B in the longitudinal direction of the web, each expressed in percentage terms, differ by at least 10% when the individual materials A and B are tested for their shrinkability in the longitudinal direction when heated to the same temperature, which is close to and below the lower of their mechanically determined melting points.

3. A cross-laminate according to claim 2, wherein the percentage of shrinkability of material A at the temperature defined in claim 2 is at least 30%.

4. A webformed cross-laminate according to claim 1 wherein the cross-section of the cross-laminate has a waved shape with stabilized waves.

5. A cross-laminate according to claim 4, wherein the wavelength measured from wave-top to wave-top on one surface of the cross-laminate is less than 5 mm.

6. A cross-laminate according to claim 1, wherein material B is composed of at least 2 generally symmetrically arranged films, each with a main direction of orientation forming an angle higher than 50° and lower than 90° to the longitudinal direction of the web.

7. A cross-laminate according to claim 1 wherein material A is composed of at least 2 generally symmetrically arranged films, each with a main direction of orientation forming an angle higher than 0° and lower than 35° to the longitudinal direction of the web.

8. A cross-laminate according to claim 1 in which materials A and/or B each comprises at least 2 films mutually bonded together, wherein the strength of said mutual bondings is greater than that of the bond between materials A and B.

9. A cross-laminate according to claim 1, wherein each of the films in both materials A and B is a coextruded film with an inner major layer for strength and exterior and intermediate minor layers on each side of said major layer, the compositions of the minor layers forming the surface of the laminate being selected for achieving desired surface properties and of the other minor layers being selected to facilitate the bonding of the films to each other.

10. A cross-laminate according to claim 9 wherein the main layer in each of the films which constitute material B consists essentially of high molecular weight high density polyethylene (HMWHDPE) or a blend of HMWHDPR and lineary low density polyethylene (LLDPE), and the main layer in each of the films which constitute material A consists essentially of LLDPE or a blend of LLDPE and HMWHDPE.

11. A cross-laminate according to claim 10, wherein between 5–20% polypropylene is added to the main layer in all films which constitute material B.

12. In a method of manufacturing a cross-laminate which comprises forming an elongated web made of a sandwich formed of different films, each exhibiting a main direction of orientation, and wherein these directions cross each other, subsequently further orienting the sandwiched films at a temperature below their melting range by stretching the same together in the longitudinal direction of the web, before or after this longitudinal stretching, also stretching the sandwiched films in the transverse direction of the web, this transverse stretching being carried out by passing the sandwiched films between grooved rollers, and bonding together the films in the sandwich to form a laminate before, during or after said longitudinal and transverse stretching operations, the improvement wherein said film sandwich consists of two materials (A') and (B'), with material (A') being situated on the one and material (B') on the other side of the sandwich, material (A') being either a) a film having a main direction of orientation generally corresponding to the longitudinal direction of the web, or b) an assembly of films having a resultant main direction of orientation generally corresponding to the said direction, and said orientation of material (A') is stronger—as measured by shrink testing the materials (A') and (B') individually—than the orientation in material (B') in the same direction, and material (B') is either a) a film having a main direction of orientation generally perpendicular to the longitudinal direction of the web, or b) an assembly of films having a resultant main direction of orientation generally perpendicular to the longitudinal direction of the web, in which the coefficient of elasticity (E) of material (A') in its unoriented state is at least 15% lower than the coefficient of elasticity of material (B') in its unoriented state and said orientation of material (B') is stronger—again measured for the materials individually—than the orientation in material (A') in said perpendicular direction.

13. A method according to claim 12 wherein material (A') forms at least 10% of the sandwich and the shrinkabilities of materials (A') and (B') in the longitudinal direction of the web, each expressed in percentage terms, differ by at least 10% according to a test in which the films within the individual materials are bonded together without change of their properties and are tested for their shrinkability in the longitudinal directed when heated to the same temperature, which is close to and below the lower of the mechanically determined melting points of the materials.

14. A method according to claim 12, wherein the orientation in material (A') independently of material (B') corresponding to the longitudinal direction of the web is made sufficiently strong to achieve that, in the final product, the percentage shrinkage of material (A') as determined when material (A') separately from material (B') quickly is heated to the a temperature close to but below its mechanically determined melting point is no less than 30%.

15. A method according to claim 12 wherein each film of materials (A') and (B') is manufactured by coextrusion, and during such coextrusion is supplied on each side with a minor layer adapted to facilitate bonding of such film to an adjacent film in the laminate.

16. A method according to claim 12 wherein at least one of the films of material (A'), prior to the sandwiching of that material with material (B') is oriented in the longitudinal direction by pulling the same against the frictional resistance of a roller or bar in contact therewith.

17. A method according to claim 16, wherein material (A)' includes one film supplied with a mainly longitudinal melt orientation, and said one film is subjected to said pulling.

18. A method according to claim 16, wherein material (A') comprises two films which are produced each with a main direction of orientation at an angle higher than zero and lower than 45° to its longitudinal direction, the two films subsequently being assembled to form a generally symmetrical sandwich and this sandwich is subjected to the frictionally acting pulling.

19. A method according to claim 16, wherein material (A') is produced by forming an elongated cross-laminate of 2 melt-oriented layers by coextrusion of such layers through counter-rotating die passages, laminating said 2 melt-oriented layers together immediately before or immediately after these layers have exited from said passages, preferably with a minor coextruded layer therebetween which is adapted to reduce bonding therebetween, the melt orientation in each of the 2 layers extending at an angle less than 45° to the longitudinal direction of this cross-laminate, and subsequently subjecting the resultant cross-laminate to longitudinal orientation by said pulling.

20. An article, such as a bag, made by heatsealing a length of the cross-laminate according to claim 1 to a length of a similar cross-laminate with a peel-type heatseal which extends generally perpendicularly to the longitudinal direction of said lengths, and in which material A of one cross-laminate is directly heatsealed to material A of the other cross-laminate.

21. A tubular or folded-over length of cross-laminate according to claim 1, adapted for manufacture of open-mouth bags or for form-and-fill bags or for form-fill-and seal bags, wherein material A forms the inner surface of the tube or folded-over length.

* * * * *